Figure 1:
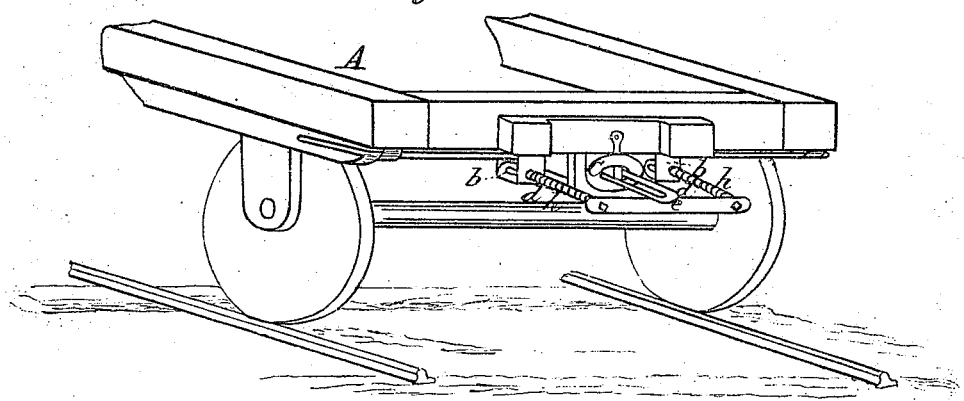

C. P. Bachelder.
Car-Coupling.

№ 72441. Patented Dec. 24, 1867.

Witnesses
R. S. Turner
W. E. Stumphs

Inventor
Cyrus P. Bachelder by
Brown & Beadle
Attorneys

United States Patent Office.

CYRUS P. BACHELDER, OF FRANKLIN, NEW HAMPSHIRE, ASSIGNOR TO HIMSELF, DANIEL BARNARD, AND STEPHEN KENRICK.

Letters Patent No. 72,441, dated December 24, 1867.

IMPROVEMENT IN CAR-COUPLING.

The Schedule referred to in these Letters Patent and making part of the same.

TO ALL WHOM IT MAY CONCERN:

Be it known that I, CYRUS P. BACHELDER, of Franklin, in the county of Merrimack, and State of New Hampshire, have invented a new and improved Device for Raising the Link in Coupling Cars; and I do hereby declare that the following is a full and exact description of the same, reference being had to the accompanying drawings, and to the letters of reference marked thereon. In the drawings—

Figure 2:
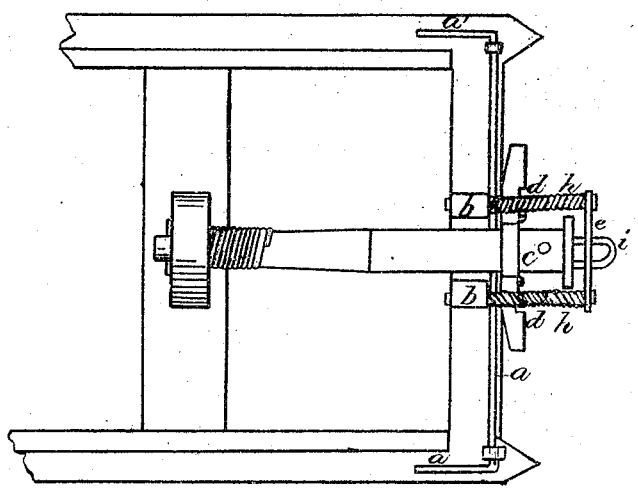

Figure 1 represents a perspective view, and
Figure 2 a bottom view of my invention.

This invention consists of a device for lifting the end of one of the ordinary links used in shackling railroad-cars, when said link is fastened in a draw-head, and its free end is below the level of the draw-head in another car, as will hereinafter more fully appear.

To enable others to make and use my invention, I will now proceed to describe its construction and operation.

A represents a car-truck; $a$ represents a transverse rod placed under the end cross-beam of said truck, and bent at its ends, so as to form handles, $a'$, projecting about at right angles to the body of the bar $a$, and extending under the side beams of the truck. The rod $a$ rests in sockets, in such manner as to be vibratory. $b\ b$ represent brackets, rigidly attached to the rod $a$, at equal distances from the ends thereof, and far enough apart to admit of the location of the draw-head $c$ between them. In these brackets are supported rods, $d\ d$, capable of sliding therein longitudinally, but not movable in any other direction. The outer ends of the rods $d\ d$ are connected by the cross-piece $e$, which slides on the said rods, and is held between nuts on the outer ends thereof, and spiral springs $h\ h$ on said rods. The cross-piece $e$ is directly beneath the link $i$.

Operation.

It is well known that the ordinary method of shackling cars with a link and pin is dangerous to the operative who has to place himself between the ends of the cars. When this mechanism is made use of, the operative need only place himself at either side of the car, by the handle $a'$, on forcing which down the cross-piece $e$ is brought up against the link $i$, raising it sufficiently to cause it to enter the draw-head of the other car. The rods $d\ d$, when the collision consequent upon shackling takes place, yield against the spiral springs $h\ h$, and thus fracture is avoided.

Having thus fully described my invention, what I claim as new, and desire to secure by Letters Patent, is—

The apparatus for raising links, consisting of the cross-bar $a$, with its handles $a'$ and brackets $b$, in combination with the rods $d$, spiral springs $h$, and cross-piece $e$, all operating substantially as and for the purpose described.

CYRUS P. BACHELDER.

Witnesses:
DANIEL BARNARD,
S. LOWELL FRENCH.